US011521028B2

(12) United States Patent
Gaidon

(10) Patent No.: US 11,521,028 B2
(45) Date of Patent: Dec. 6, 2022

(54) META-LEARNING NEURAL ARCHITECTURE SEARCH VIA GRAPH NETWORKS ON SEARCH SPACE LATTICES

(71) Applicant: TOYOTA RESEARCH INSTITUTE, INC., Los Altos, CA (US)

(72) Inventor: Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 417 days.

(21) Appl. No.: 16/846,134

(22) Filed: Apr. 10, 2020

(65) Prior Publication Data

US 2021/0319272 A1 Oct. 14, 2021

(51) Int. Cl.
*G06K 9/62* (2022.01)
*G06N 20/00* (2019.01)
*G06N 3/08* (2006.01)

(52) U.S. Cl.
CPC ........... *G06K 9/6296* (2013.01); *G06K 9/623* (2013.01); *G06N 3/082* (2013.01); *G06N 3/084* (2013.01); *G06N 20/00* (2019.01)

(58) Field of Classification Search
CPC . G09G 5/397; G09G 5/74; G06T 3/40; H04H 1/3935
See application file for complete search history.

(56) References Cited

U.S. PATENT DOCUMENTS 6,922,485 B2 * 7/2005 Hirata .................... G06V 10/56
382/164
6,990,233 B2 * 1/2006 Park .................. G06V 10/7515
382/209

(Continued)

OTHER PUBLICATIONS

Cheng et al., "SwiftNet: Using Graph Propagation as Meta-knowledge to Search Highly Representative Neural Architectures", Computer Science, Machine Learning, Submitted on Jun. 19, 2019 (v1), last revised Jun. 25, 2019 (this version, v2), 10 pages.

(Continued)

*Primary Examiner* — Yosef Kassa
(74) *Attorney, Agent, or Firm* — Sheppard, Mullin, Richter & Hampton LLP; Hector A. Agdeppa; Daniel N. Yannuzzi

(57) ABSTRACT

One or more embodiments of the disclosure include systems and methods that use meta-learning to learn how to optimally find a new neural network architecture for a task using past architectures that were optimized for other tasks, including for example tasks associated with autonomous, semi-autonomous, assisted, or other driving applications. A computer implemented method of the disclosure includes configuring a search space lattice comprising nodes representing operator choices, edges, and a maximum depth. The method includes defining an objective function. The method further includes configuring a graph network over the search space lattice to predict edge weights over the search space lattice. The method also includes alternating optimization between (1) weights of the graph network, to optimize the objective function over a validation set, and (2) weights corresponding to nodes of the search space lattice that are randomly initialized or configured using previously trained paths in the search space lattice.

17 Claims, 5 Drawing Sheets

(56) References Cited

U.S. PATENT DOCUMENTS

| | | | | |
|---|---|---|---|---|
| 7,274,470 | B2* | 9/2007 | Lemelin | G06T 7/521 |
| | | | | 356/604 |
| 7,502,521 | B2* | 3/2009 | Sun | G06T 5/005 |
| | | | | 382/254 |
| 7,760,956 | B2* | 7/2010 | Lin | G06V 20/40 |
| | | | | 382/254 |
| 8,218,863 | B2* | 7/2012 | Hasegawa | G06V 30/413 |
| | | | | 358/1.15 |
| 2019/0026639 | A1 | 1/2019 | Vasudevan | |
| 2019/0251439 | A1 | 8/2019 | Zoph | |
| 2019/0286984 | A1 | 9/2019 | Vasudevan | |

OTHER PUBLICATIONS

Hong et al., "EDAS: Efficient and Differentiable Architecture Search", arXiv:1912.01237v1 [cs.CV] Dec. 3, 2019, 9 pages.

Ma et al., "Deep Neural Architecture Search with Deep Graph Bayesian Optimization,". In IEEE/WIC/ACM International Conference on Web Intelligence (WI '19), Oct. 14-17, 2019, Thessaloniki, Greece. ACM, New York, NY, USA, 8 pages, https://doi.org/10.1145/3350546. 3360740.

She et al. "Multi-Objective Neural Architecture Search via Predictive Network Perlormance Optimization", ICLR 2020 Conference Blind Submission, Sep. 25, 2019 (modified: Dec. 23, 2019), 20 pages.

Zhou et al. "Auto-GNN: Neural Architecture Search of Graph Neural Networks", Conference'17, Jul. 2017, Washington, DC, USA, 9 pages.

Gao et al., GraphNAS: Graph Neural Architecture Search with Reinforcement Learning, Computer Science, Machine Learning, Submitted on Apr. 22, 2019 (v1), last revised Aug. 20, 2019 (this version, v2), 7 pages.

Zhang et al., AutoShrink: A Topology-aware NAS for Discovering Efficient Neural Architecture, Computer Science, Machine Learning, Submitted on Nov. 21, 2019, 8 pages.

* cited by examiner

META-LEARNING NEURAL ARCHITECTURE SEARCH VIA GRAPH NETWORKS ON SEARCH SPACE LATTICES

TECHNICAL FIELD

The present disclosure relates generally to machine learning, and in particular, some implementations may relate to meta-learning using graph networks on search space lattices.

DESCRIPTION OF RELATED ART

Neural networks can be formed from a set of algorithms modeled loosely after the human brain. Generally, a neural network is a mathematical object that comprises a set of nodes and Directed Acyclic Graphs ("DAGs") that link those nodes with a relation that is directional (e.g., inputs and outputs). A DAG is a finite directed graph with no directed cycles, consisting of a finite number of vertices and edges with each edge directed from one vertex to another. Typical neural networks may input, for example, an image and feed the image into a single node or layer (e.g., a convolutional layer with some convolutional fields/weights) that processes the image and outputs an activation map or features. The output then becomes the input of another layer of the network (e.g., another convolutional or other type of layer).

Neural networks may be designed by hand based on human intuition and limited experimental evidence. For example, a designer would form the network architecture or characteristics of the DAG, pick the weights of the nodes in the network, and arrange the connectivity of the nodes (e.g., into a chain of layers/operations in a sequential or feed forward arrangement). Such networks may use feed forward or sequential models to learn the node/layer weights, for example by backpropagation. But the architecture is generally fixed.

Neural Architecture Search ("NAS"), including gradient based NAS, can be useful for designing neural networks automatically and can serve as a replacement for hand-crafted networks for challenging tasks such as computer vision and other applications.

BRIEF SUMMARY OF THE DISCLOSURE

The present disclosure includes systems, methods, and devices that use meta-learning to learn how to optimally find a new neural network architecture using past architectures that were optimized for other tasks, for example tasks associated with autonomous, semi-autonomous, assisted, or other driving applications.

One or more embodiments of the present disclosure include a computer implemented method. The method may include configuring a search space lattice. The search space lattice may include nodes representing operator choices, edges, and a maximum depth. In one or more example implementations of the computer implemented method, the maximum depth includes a limit in the number of layers within the search space lattice.

The method may further include defining an objective function.

The method may additionally include configuring a graph network over the search space lattice to predict edge weights over the search space lattice. Predicting the edge weights over the search space lattice may include connecting the nodes of the search space lattice into paths corresponding to a deep net architecture.

Moreover, the method may include alternating optimization between (1) weights of the graph network, to optimize the objective function over a validation set, and (2) weights corresponding to nodes of the search space lattice that are randomly initialized or configured using previously trained paths in the search space lattice. Optimization of the weights of the graph network may include predicting the edge weights over the search space lattice. Optimization of the weights of the graph network may include defining edge weights for the edges of the search space lattice.

The computer implemented method, in one or more embodiments, may further include decoding one or more architectures by selecting paths in the search space lattice using edge weights of the paths. Decoding the one or more architectures may include using a Viterbi algorithm. Selecting the paths in the search space lattice may include removing edges of the search space lattice that have low edge weight relative to other edges in the search space lattice.

One or more embodiments of the present disclosure include a non-transitory computer-readable medium having executable instructions stored thereon that, when executed by a processor, perform certain operations. Such operations may include configuring a graph network over a search space lattice including nodes and edges. The graph network may be a directed acyclic graph network. The graph network may be adapted to predict edge weights over the search space lattice. Predicting the edge weights over the search space lattice may include connecting the nodes of the search space lattice into paths corresponding to a deep net architecture.

Such operations my further include adjusting weights of the graph network to optimize an objective function over a validation set. Adjusting the weights of the graph network may include predicting the edge weights over the search space lattice. Adjusting the weights of the graph network may include defining edge weights for the edges of the search space lattice.

Such operations may also include optimizing weights corresponding to nodes of the search space lattice that are randomly initialized or configured using previously trained paths in the search space lattice.

The operations may also include outputting information that can be used to decode one or more architectures by selecting paths in the search space lattice using edge weights of the search space lattice. Selecting the paths in the search space lattice may include removing edges of the search space lattice that have low edge weight relative to other edges in the search space lattice.

In one or more embodiments of the present disclosure, a non-transitory computer-readable medium having executable instructions stored thereon that, when executed by a processor, performs certain operations. Such operations may include decoding one or more deep net architectures by selecting paths in a search space lattice including nodes and edges using edge weights of the search space lattice. The edge weights of the selected paths may have been optimized using a graph network defined over the search space lattice. The graph network may be adapted to predict the edge weights of the search space lattice. In one or more example implementations, the graph network may be a directed acyclic graph network.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto. It should be appreciated that the various systems and devices disclosed herein may be used to implement any of the operations disclosed herein with reference to various methods, and that the methods disclosed herein may be used in connection with any of the systems and devices disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
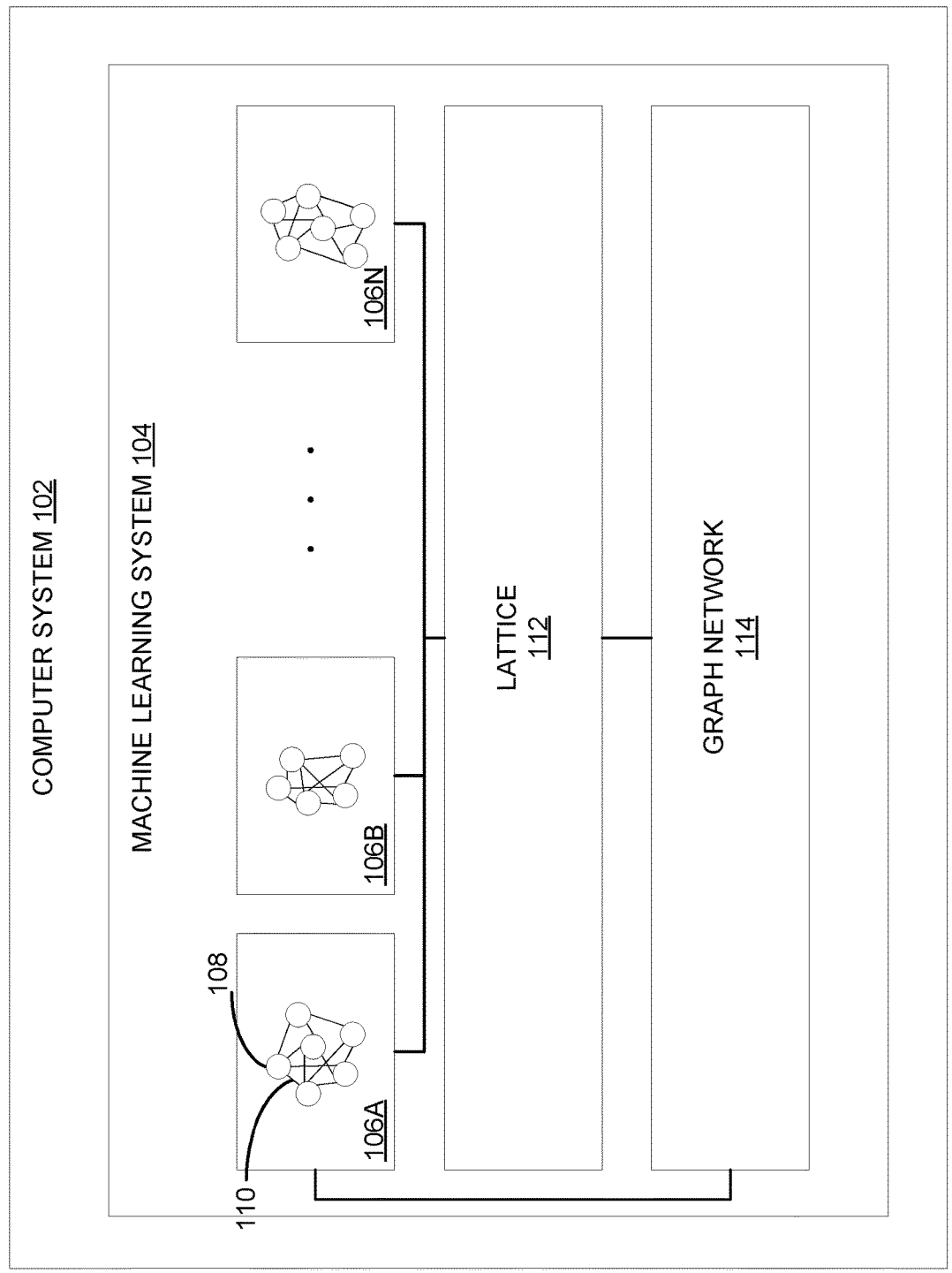
FIG. 1 is an example representation of a computer system that may be used to implement one or more embodiments of the systems and methods disclosed herein.

The figures are not exhaustive and do not limit the present disclosure to the precise form disclosed.

DETAILED DESCRIPTION

To find a network architecture that is well suited for a given task (e.g., detecting pedestrians), the weights of the nodes as well as the weights of the edges of a search space are optimized. Due to the combinatorial nature of the search space of possible neural network architectures, NAS algorithms typically limit the search space by structuring it as a lattice. Such a lattice can represent all possible architectures that can be obtained by combining a restricted set of operations into a limited set of layers/nodes. Optimization over the search space is either done combinatorially via random search (including variants like Genetic Algorithms) or by gradient-based optimization over a smooth surrogate.

Thus, finding an architecture that is optimal for a given task using NAS can be time consuming and inefficient. In a system that must handle multiple tasks, such as detecting various objects such as pedestrians, bicyclists, cars, trucks, etc., typical NAS methods treat each task separately. Thus, such systems restart the optimization process from scratch for each task. That is, such systems do not leverage the structure of the lattice itself, in particular the fact that neighboring paths in the lattice corresponding to at least somewhat related tasks represent related architectures that can be expected to yield similar downstream performance. This adds to the required processing time.

One way to avoid restarting the optimization process from scratch for an additional task is to repurpose the node weights from the previous task, also known as transfer learning. With transfer learning, however, the tasks share the same architecture. Moreover, transfer learning does not work well for NAS because in NAS techniques the newly identified architecture cannot refer to the weights used for a previous task. In particular, those weights correspond to specific nodes, whereas NAS techniques involve searching for architectures with different nodes and connections.

In view of the above shortcomings, there is a need for a system that quickly finds new architectures for new tasks.

Accordingly, various embodiments of the disclosed technology include systems and methods that use meta-learning to learn how to optimally find a new neural network architecture using past architectures that were optimized for other tasks. For example, embodiments of the present disclosure involve learning to predict lattice edge weights in a way that leverages neighborhood relations in the space of deep net architectures. Leveraging these relations enables faster NAS convergence and finding better architectures for the same amount of training data.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Embodiments of the present disclosure can provide systems and methods that quickly and efficiently find new neural network architectures for new tasks, for example, tasks used in connection with image processing systems such as those used for autonomous or semi-autonomous or other driving systems, as well as other tasks and applications, including any machine learning application. In particular, one or more embodiments of the disclosed technology include a computer system that uses meta-learning to learn how to optimally find a new neural network architecture using past architectures that were optimized for other tasks. For example, one or more embodiments of the present disclosure involve learning to predict lattice edge weights in a way that leverages neighborhood relations in the space of deep net architectures. Leveraging these relations enables faster NAS convergence and finding better architectures for the same amount of training data.

FIG. 1 depicts example computer system 102 that may be used to implement aspects of the present disclosure. Computer system 102 may include machine learning system 104 that may in turn use graph network 114, lattice 112, and models 106A-106N. Graph network 114 may run on top of lattice 112, as will be described further herein. Graph network 114, in one or more embodiments, is a DAG. It should be appreciated that a restricted set of DAGs can be represented itself by DAGs, which may be referred to as supernets. Two chains of a DAG running in parallel can also be referred to as a DAG, and connecting two nodes 108 can form a DAG. The superset of all possible architectures can also be referred to as a DAG.

Lattice 112 may be used to describe the geometric structure of a DAG and may be considered a specific type of DAG and may have a grid structure. Lattice 112 may include individual models 106A-106N and may represent the whole space of possible architectures. Each of models 106A-106N may include nodes 108 and edges 110 that may be used to form paths associated with a particular task. Such tasks may include, for example, pedestrian detection, bicyclist detection, vehicle detection, and other tasks that may be used for automated, semi-automated, and other driving applications, as well as other tasks applicable more generally to image processing and detection.

As mentioned above, machine learning system 104 may be used to find architectures for a given task using past knowledge about architectures found for tasks having commonalities with the given task. For example, model 106A may already have been trained using machine learning system 104 in connection with a previous NAS process for a pedestrian search task. Thus, in this example model 106A may be for pedestrian detection. After model 106A has been trained, it may be desired to train model 106B for bicyclist detection. Machine learning system 104 may be used to analyze commonalities between pedestrian detection and bicyclist detection, where such commonalities may imply architecture compatibility. For example, both tasks may involve to some extent detecting a human form. Machine learning system 104 may then use aspects of the architecture associated with pedestrian detection in finding the architecture for bicyclist detection and training model 106B. In this manner, machine learning system 104 may use knowledge about past architectures to quickly find new architectures.

More specifically, using the techniques of the present disclosure, graph network 114 can search for new architectures quickly using meta-learning. The meta-learning of the present disclosure may involve optimization within optimization. In other words, machine learning system 104 may learn by reusing what was learned for a related task and determined for a given model 106A-106N. Instead of finding which edges of a lattice to activate, most NAS systems, for example those employing gradient based NAS, activate all edges of the lattice and predict the weight per edge and later pick the path with the greatest weight. This may be referred to as a NAS via backpropagation approach. Machine learning system 104 and in particular graph network 114 repurposes the edge weights from an already trained model (e.g., model 106A) for a given task. For example, the edge weights for a pedestrian may provide a hint or insight into what the edge weights should be for a bicyclist. Graph network 114 runs on top of lattice 112 and learns to predict edge weights of lattice 112 for a new model (e.g., model 106B) based on commonalities between the models (e.g., models 106A and 106B).

If for a given task, the edge weights are predicted by graph network 114, which may be thought of as an auxiliary network, when a new task, which may be associated with model 106B for example, is trained, machine learning system 104 can just resume optimization of graph network 114 to optimize for the new task. For example, once graph network 114 has been optimized (e.g., using backpropagation) for pedestrian detection, which may be associated with model 106A for example, graph network 114 can continue learning to optimize, for example, model 106B for bicyclist detection. In particular, the structure and architecture of lattice 112, and not just the weights thereof, can be leveraged between tasks if there are commonalities between the tasks (e.g., between pedestrian and bicyclist detection). The architecture being leveraged according to one or more embodiments of the present disclosure may not just be edges 110 of lattice 112; rather, there may be a notion of local structure, such as local groups of nodes 108 or parts of the network, including multiple nodes 108, that may be locally connected in a particular way. Graph network 114 can be designed to detect such local structures and their relations, capture commonalities, and leverage them in training further models 106A-106N. For example, graph network 114 can suggest architectures by suggesting edge weights for lattice 112.

In a sense, machine learning system 104 may be thought of as a meta-learning system, where the lowest level corresponds to the weights for nodes 108, and the NAS level includes edges 110 that may connect nodes 108. Moreover, meta-learning can be achieved by searching over the space of DAGs by casting each task as a separate learning objective, and then reusing models 106A-106N across tasks. In other words, whereas some systems optimize a network for a fixed architecture (e.g., using backpropagation), and some systems simply find architectures, one or more embodiments of the present disclosure involve finding new architectures more quickly for related tasks that have already been optimized. In example implementations of the present disclosure, by re-using knowledge from past tasks according to one or more embodiments, a new architecture for a new task may be found in a fraction of the time (e.g., an order of magnitude faster) than when ignoring pas knowledge of previously tasks. This can mean finding a new architecture in hours instead of days, or requiring less computing resources for the search.

Finding new architectures quickly may involve searching over the space of lattice 112 (which, for example, may be thought of as a DAG space), or optimizing a given objective. This may involve minimizing a loss function, if a gradient based optimization approach using backpropagation is employed. With multiple objectives, meta-learning what is learned for certain objectives may be quickly reused for new objectives. In one or more embodiments, in addition or as an alternative to backpropagation, heuristics or evolutionary or reinforcement learning can be employed for the meta-level learning. For example, backpropagation may be faster than evolutionary or reinforcement learning but typically requires computing a gradient. Thus, the present disclosure may employ any or multiple of these approaches depending on the circumstances.

In one or more embodiments of the present disclosure, graph network 114 is used during the training process, which may be carried out within machine learning system 104 of computer system 102. As described herein, computer system 102 may reside in a back end system relative to a vehicle. By way of example, once optimization has converged for all models 106A-106N that are desired, models 106A-106N can be uploaded to the computer system of a vehicle (e.g., machine learning system 402 with reference to FIG. 4), for example in the form of trained machine learning models 430, and used for autonomous or semi-autonomous or other driving systems. It should also be appreciated upon studying the present disclosure that in one or more embodiments all or part of computer system 102 and/or machine learning system 104 and their functionalities described herein may reside on board a vehicle. For example, all or part of computer system 102 and/or machine learning system 104 may reside within machine learning system 402 and their functionalities may be performed thereby.

Optimization may be considered converged when a given objective stops improving, or after a fixed number of iterations, or for example when a local maximum or optimum is reached. Machine learning system 104 may also consider a threshold difference between two or several iterations of an optimization process, where the process is complete when the threshold difference is met. In other examples, the system may constrain the reference and current architectures to be sufficiently close before the process is considered complete. By way of illustration, it may not be desirable for edge weights to change beyond a certain level where two tasks are known to be similar. Or, certain parts of the architecture may be allowed to be more different that others where it is expected that the differences will be greater, based on commonalities between the tasks. Thus, in one or more embodiments where graph network 114 is being used to predict the architectures or edge weights, optimization may be constrained based on expected similarities.

Machine learning system 104 can include circuitry to control various aspects of the machine learning operations described herein. For example, machine learning system 104 may include a microcomputer that includes a one or more processing units (e.g., microprocessors), memory storage (e.g., RAM, ROM, etc.), and I/O devices (e.g., a data interface). The processing units of machine learning system 102 execute instructions stored in memory to control one or more systems or subsystems in machine learning system 104 and/or computer system 102. Upon studying the present disclosure, one of skill in the art will appreciate that features described with respect to machine learning system 402 with reference to FIG. 4 may be used in connection with machine learning system 104.

Figure 2:
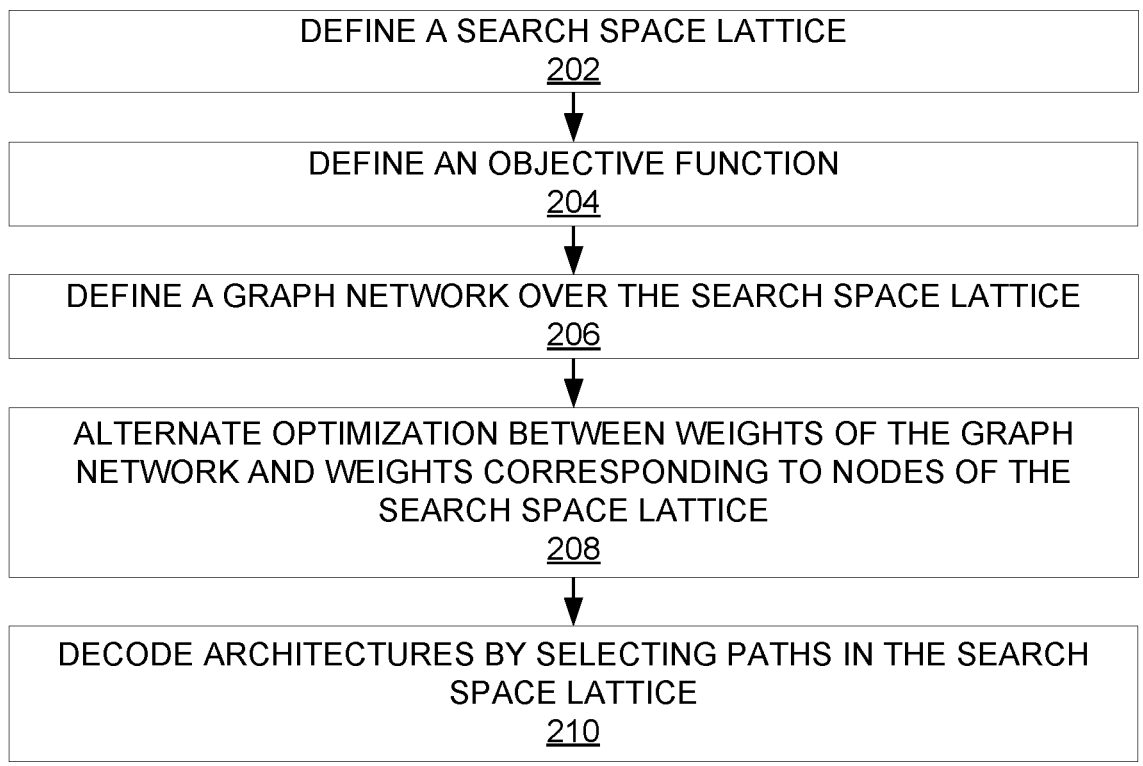
FIG. 2 illustrates example operations of a computer implemented method according to one or more embodiments of the present disclosure.

FIG. 2 provides operations that may be carried out in connection with computer implemented method 200, according to one or more embodiments of the present disclosure. At operation 202, computer implemented method 200 may involve configuring a search space lattice 112. For example, machine learning system 104 may set up, configure, and/or define lattice 112, which may consist of all possible architectures to be searched and/or considered. The search space lattice 112 may include nodes 108, which may represent operator choices, edges 110 (e.g., connectivity), and a maximum depth. The search space lattice 112 may be formed from multiple parallel branches of nodes 108, or any other configuration formed from chains of nodes 108 where the chains are directly or indirectly connected to each other. The operator choices may include, for example, a convolutional filter, a fully connected layer, or a Boolean operator, etc. The maximum depth may be the maximum number of nodes 108 or layers present in lattice 112. Operation 202 may be carried out using machine learning system 104.

At operation 204, computer implemented method 200 may involve defining an objective function. For example, the objective function may be or include one or more of a validation error, latency, other objectives, or a combination thereof. Other examples of an objective function include the number of times a pedestrian may be confused with a non-pedestrian, or the like. Operation 204 may be carried out using machine learning system 104.

At operation 206, computer implemented method 200 may involve configuring graph network 114 over the search space lattice 112 to predict edge 110 weights over the search space lattice 112. Operation 206 may involve setting up and/or defining graph network 114. Graph network 114 can be used to predict edges 110 and thus predict an architecture for a particular model 106A-106N. For example, an optimization of the weights of graph network 114 can be used to predict the edge 110 weights of the search space lattice 112. In this manner, graph network 114 can use meta-learning to learn how to optimally find a new neural network architecture using previously trained models (e.g., 106A) corresponding to architectures that have been optimized for other tasks. Operation 206 may be carried out using machine learning system 104.

At operation 208, computer implemented method 200 may involve alternative optimization between (1) weights of graph network 114, to optimize the objective function over a validation set used for training purposes, and (2) weights corresponding to nodes 108 of the search space lattice 112 that are randomly initialized or configured using previously trained paths in the search space lattice 112. When optimizing or adjusting the weights of graph network 114, the node 108 weights of the search space lattice 112 may be frozen and the edge 110 weights of the search space lattice 112 may be optimized or predicted by iteratively adjusting or optimizing the weights of graph network 114.

Optimization or adjustment of the weights of graph network 114 may include predicting edge 110 weights over the search space lattice 112. Predicting edge 110 weights over the search space lattice 112 may include connecting nodes 108 of the search space lattice 112 into paths corresponding to a deep net architecture. In one or more embodiments, optimization of the weights of graph network 114 includes defining edge 110 weights for edges 110 of the search space lattice 112.

In connection with operation 208, with respect to the weights corresponding to nodes 108, where no paths have been previously trained, the weights can be randomly initialized. When previously trained paths exist, the node weights can be leveraged by graph network 114, for example, using similarities between the associated tasks. Operation 208 may be carried out using machine learning system 104.

Operation 208 may optionally involve outputting information that can be used to decode one or more architectures by selecting paths in the search space lattice 112 using edge 110 weights of the paths. For example, machine learning system 104 may output information that may be used by machine learning system 402 within a vehicle's computer system to decode one or more architectures (e.g., from trained machine learning models 430 with reference to FIG. 4), as described in connection with operation 210.

At operation 210, computer implemented method 200 may optionally involve decoding one or more architectures by selecting paths in the search space lattice 112 using edge 110 weights of the paths. Operation 210 may be carried out once models 106A-106N have been trained using machine learning system 104 and, for example, uploaded to a vehicle's computer system in the form of trained machine learning models 430. At this stage, training is complete and the edge 110 weights have been optimized as predicted by graph network 114 that has been trained, and all nodes 108 have been assigned weights that were previously trained in connection with operation 208. Selecting the paths in the search space lattice 112 may include removing edges 110 of the search space lattice 112 that have low edge weight relative to other edges 110 in the search space lattice 112. For example, any edge 110 with a weight below a threshold may be pruned from lattice 112 and any nodes 108 no longer connected within lattice 112 by edges 110 may likewise be pruned. Quantiles may be used to determine relatively low edge weights. For example, the bottom 10% of the edge weight values may be pruned. In one or more embodiments, decoding the one or more architectures may be done using a Viterbi algorithm or similar or other algorithms. Operation 210 may, for example, be carried out using machine learning system 402 within the computer system of a vehicle, for example, in connection with autonomous or semi-autonomous or other driving applications. In one or more embodiments, operation 210 may be carried out using computer system 102 and/or machine learning system 104.

Figure 3:
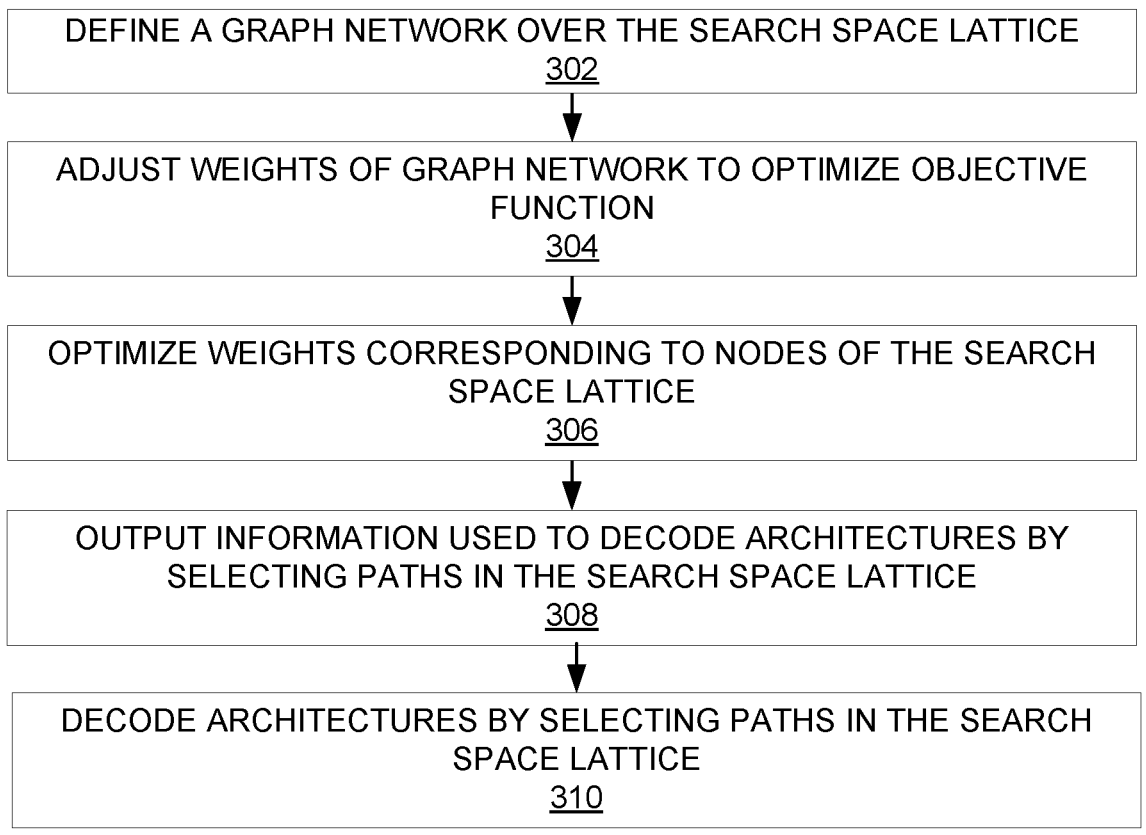
FIG. 3 illustrates example operations of a computer implemented method according to one or more embodiments of the present disclosure.

FIG. 3 provides operations that may be carried out in connection with computer implemented method 300, according to one or more embodiments of the present disclosure. At operation 302, computer implemented method 300 may involve configuring graph network 114 over a search space lattice 112. The search space lattice 112 may include nodes 108 and edges 110 connecting nodes 108. Graph network 114 is adapted to predict edge 110 weights over the search space lattice 112. Operation 302 may be carried out using machine learning system 104.

At operation 304, computer implemented method 300 may involve adjusting weights of graph network 114 (e.g., using backpropagation) to optimize an objective function over a validation set. Operation 204 may be carried out using machine learning system 104.

At operation 306, computer implemented method 300 may involve optimizing weights corresponding to nodes 108 of the search space lattice 112. The weights corresponding to nodes 108 may be randomly initialized or configured using previously trained paths in the search space lattice. Operation 306 may be carried out using machine learning system 104.

At operation 308, computer implemented method 300 may optionally involve outputting information that can be used to decode one or more architectures by selecting paths in the search space lattice 112 using edge 110 weights of the search space lattice 112. Operation 308 may be carried out by machine learning system 104 and/or computer system 102, which may be used to provide the information to the onboard computer system of a vehicle (e.g., to machine learning system 402 with reference to FIG. 4).

At operation 310, computer implemented method 300 may optionally involve decoding one or more architectures by selecting paths in the search space lattice 112 using edge 110 weights of the search space lattice 112. Operation 310 may, for example, be carried out using machine learning system 402 within the computer system of a vehicle, for example, in connection with autonomous, semi-autonomous, assisted, or other driving applications.

Figure 4:
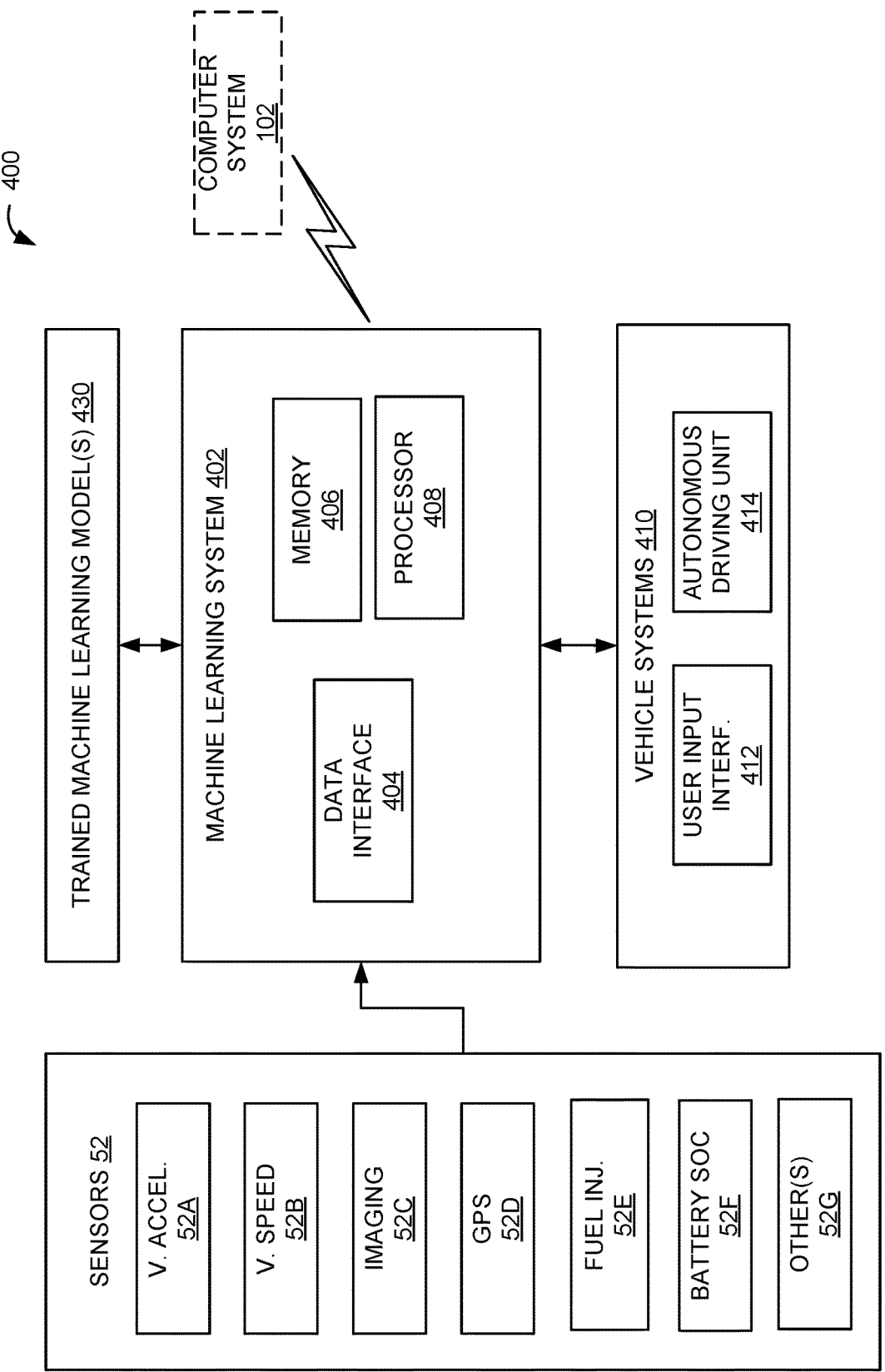
FIG. 4 illustrates an example block diagram of a vehicle that may use a machine learning system in accordance with one or more embodiments of the systems and methods described herein.

FIG. 4 provides a diagram of example system 400 that depicts various systems and elements that may be present on a vehicle with or in which aspects of the present disclosure may be implemented. For example, system 400 may include one or more sensors 52, machine learning system 402, and/or vehicle systems 410 (which may include user input interface 412 and autonomous driving unit 414). As shown in FIG. 4 and described herein, machine learning system 402 may be coupled to computer system 102.

As shown in FIG. 1, computer system 102 may include machine learning system 104. Machine learning system 104 may be used to implement various operations of computer implemented methods 200 and 300, as described herein. For example, machine learning system 104 of computer system 102 may be used to configure a search space lattice 112 (e.g., at operation 202), define an objective function (e.g., at operation 204), configure graph network 114 over the search space lattice 112 (e.g., at operation 206), and alternate optimization between weights of graph network 114 and weights corresponding to nodes 108 of the search space lattice 112 (e.g., at operation 208). Or, for example, machine learning system 104 of computer system 102 may be used to configure graph network 114 over the search space lattice 112 (e.g., at operation 302), adjust weights of graph network 114 to optimize an objective function (e.g., at operation 304), optimize weights corresponding to nodes 108 of the search space lattice 112 (e.g., at operation 306), and output information used to decode architectures by selecting paths in the search space lattice 112 (e.g., at operation 308).

Turning again to FIG. 4, the information output by machine learning system 104 of computer system 102 may be conveyed to machine learning system 402, which may be on board a vehicle for example. For example, the information may be uploaded as an executable file to the vehicle as trained machine learning models 430. Machine learning system 402 may then use the information to decode one or more architectures (e.g., deep net architectures) by selecting paths in the search space lattice 112 (e.g., at operations 210 and 310). Additionally, for example, machine learning system 402 may obtain information from sensors 52, such as imaging information, and process the information through trained learning models 430 to assist in controlling vehicle systems 410, including autonomous driving unit 414. Here it should be noted that in one or more embodiments autonomous driving unit 414 may be a semi-autonomous, assisted driving, or other vehicle control unit.

By way of illustration, the imaging information captured using imaging sensor 52C may include an obstacle to be detected. Machine learning system 402 may use trained models 430 to determine whether the obstacle is a pedestrian or a bicyclist and provide information to vehicle systems 410 that enables autonomous driving unit 414 to control the vehicle accordingly.

As alluded to above, one or more sensors 52 may provide signals that indicate vehicle operating conditions or characteristics, or signals that can be used to derive vehicle operating conditions or characteristics. These may include, but are not limited to vehicle acceleration 52A, vehicle speed 52B, imaging 52C, GPS 52D, fuel injection 52E, battery 52F, and other sensors 52G. Accordingly, system 400 can include a plurality of sensors 52 that can be used to detect various conditions internal or external to a vehicle and provide sensed conditions to machine learning system 402 (which may be implemented as one or a plurality of individual control circuits) or vehicle systems 410.

In one or more embodiments, one or more of the sensors 52 may include their own processing capability to compute the results for additional information that can be provided to other elements of system 400, such as machine learning system 402 and/or vehicle systems 410. In one or more embodiments, one or more of sensors 52 may be data-gathering-only sensors that provide only raw data to other blocks within system 400. In one or more embodiments, hybrid sensors may be included that provide a combination of raw data and processed data. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles (including, for example, pedestrians, bicyclists, other vehicles, etc.), and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Sensors 52 can provide information to machine learning system 402 via data interface 404. For example, imaging sensor 52C may provide images or video to machine learning system 302 via data interface 304. Machine learning system 402 can process the images or video and communicate with vehicle systems 410 for purposes of autonomous, semi-autonomous, assisted, or other types of driving using autonomous driving unit 414, or for other forms of vehicle control.

Machine learning system 402 can include circuitry to control various aspects of the machine learning operations described herein. For example, machine learning system 402 may include a microcomputer that includes a one or more processing units 408 (e.g., microprocessors), memory storage 406 (e.g., RAM, ROM, etc.), and I/O devices (e.g., data interface 404). The processing units of machine learning system 402 execute instructions stored in memory 406 to control one or more systems or subsystems in system 400, including vehicle systems 410 and in particular autonomous driving unit 414.

Processor 408 can include a GPU, CPU, microprocessor, or any other suitable processing system. Memory 406 may include one or more various forms of memory or data storage (e.g., flash, RAM, etc.) that may be used to store trained learning machine learning models 430 that may be uploaded from remote computer system 102 via any type of communication medium, instructions and variables for processor 308 as well as any other suitable information. For example, computer system 102 can be used, possibly in conjunction with machine learning system 104 shown in FIG. 1, to perform various operations of methods 200 and 300 and output information that may be used to decode architectures by selecting paths in a search space lattice 112. This information may be communicated to machine learning system 402 on board a vehicle via any form of wired or wireless communication. By way of example, the information may be uploaded as a executable file.

Memory 406 can be made up of one or more modules of one or more different types of memory, and may be configured to store data and other information as well as operational instructions that may be used by the processor 408 to perform machine learning functions within the vehicle.

Although the example of FIG. 4 is illustrated using processor and memory circuitry, as described below with reference to circuits disclosed herein, machine learning system can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up machine learning system 302.

As alluded to above, machine learning system 402 may include one or more communication circuits, including either or both a wireless transceiver circuit with an associated antenna (not illustrated) and/or a wired I/O interface with an associated hardwired data port (not illustrated) to couple to sensors 52 and/or computer system 102. The communications circuit used to connect machine learning system 402 with computer system 102 may be part of data interface 404 or may be separate. Communications between machine learning system 402 and sensors 52 or computer system 102 can include either or both wired and wireless communications circuits to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

Data interface 404 can include a transmitter and a receiver (not shown) for hardwired communications with other devices. For example, data interface 404 can provide a hardwired interface to other components, including sensors 52, vehicle systems 410, and/or computer system 102. Data interface 404 can communicate with other devices using Ethernet or any of a number of other wired communication protocols whether standardized, proprietary, open, point-to-point, networked or otherwise.

It should also be appreciated that in one or more embodiments, machine learning system 402 may be omitted. In such embodiments, sensors 52 may be coupled to vehicle system 410 and trained machine learning models 430 may be uploaded to memory accessible to vehicle systems 410 and used by autonomous driving unit 414. It will be appreciated in such embodiments that vehicle systems 410 may include a data interface, communications circuits, memory, and a processor.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Figure 5:
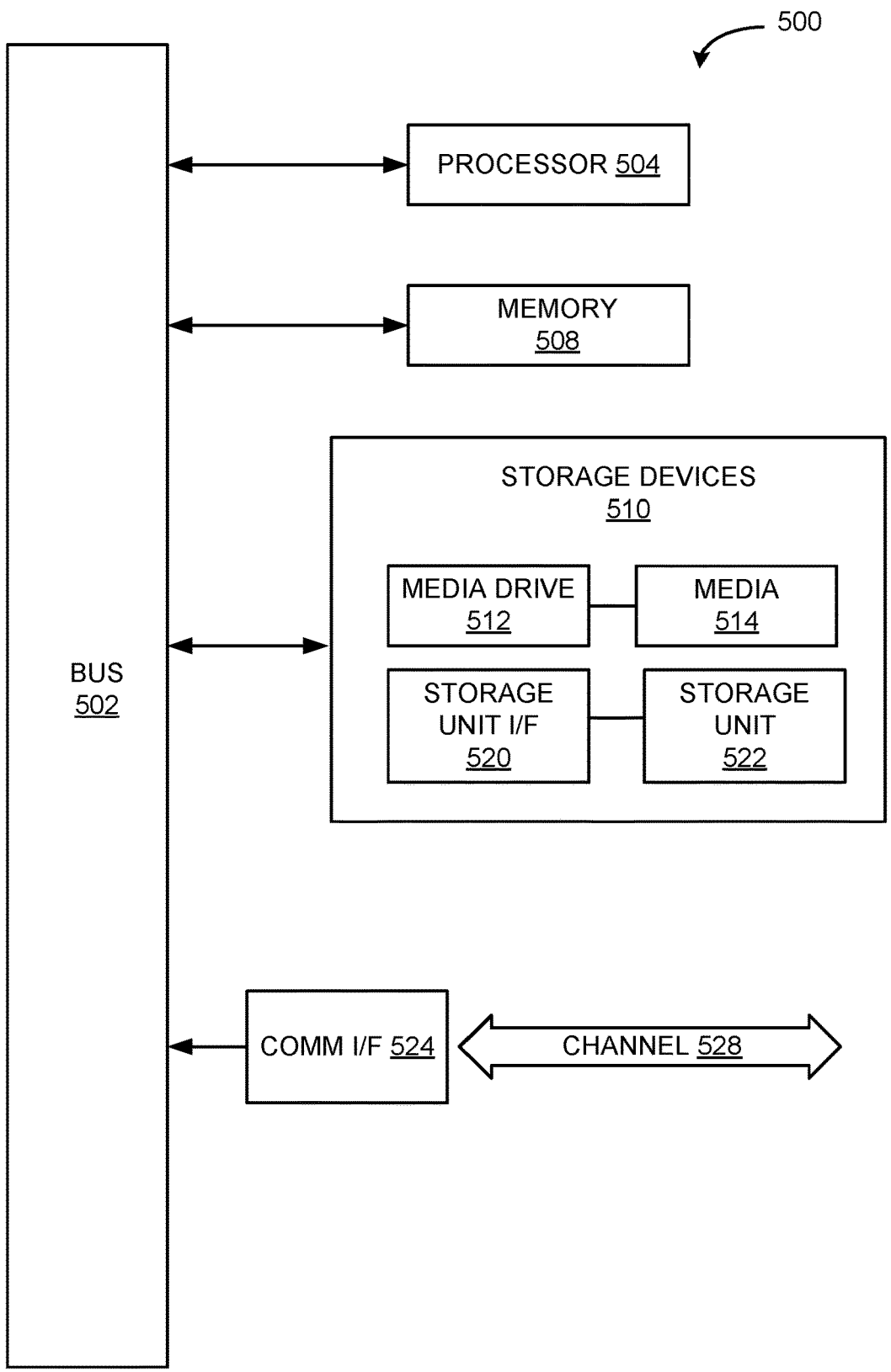
FIG. 5 is an example computing component that may be used to implement various features of one or more embodiments described in the present disclosure.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principles disclosed herein may also extend to other vehicle types as well.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDAs, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up computer system 102, machine learning system 402, and/or vehicle systems 410. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage devices 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions or operations of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer implemented method, comprising:
configuring a search space lattice, the search space lattice comprising nodes representing operator choices, edges, and a maximum depth;
defining an objective function;
configuring a graph network over the search space lattice to predict edge weights over the search space lattice; and
alternating optimization between (1) weights of the graph network, to optimize the objective function over a validation set, and (2) weights corresponding to nodes of the search space lattice that are randomly initialized or configured using previously trained paths in the search lattice.

2. The computer implemented method of claim 1, wherein the maximum depth comprises a limit in the number of layers within the search space lattice.

3. The computer implemented method of claim 1, wherein optimization of the weights of the graph network comprises predicting the edge weights over the search space lattice.

4. The computer implemented method of claim 3, wherein predicting the edge weights over the search space lattice comprises connecting the nodes of the search space lattice into paths corresponding to a deep net architecture.

5. The computer implemented method of claim 1, wherein optimization of the weights of the graph network comprises defining edge weights for the edges of the search space lattice.

6. The computer implemented method of claim 1, further comprising decoding one or more architectures by selecting paths in the search space lattice using edge weights of the paths.

7. The computer implemented method of claim 6, wherein decoding the one or more architectures comprises using a Viterbi algorithm.

8. The computer implemented method of claim 6, wherein selecting the paths in the search space lattice comprises removing edges of the search space lattice that have low edge weight relative to other edges in the search space lattice.

9. A non-transitory computer-readable medium having executable instructions stored thereon that, when executed by a processor, perform the operations of:
configuring a graph network over a search space lattice comprising nodes and edges, wherein the graph network is adapted to predict edge weights over the search space lattice;
adjusting weights of the graph network to optimize an objective function over a validation set; and
optimizing weights corresponding to nodes of the search space lattice that are randomly initialized or configured using previously trained paths in the search space lattice.

10. The non-transitory computer-readable medium of claim 9, wherein adjusting the weights of the graph network comprises predicting the edge weights over the search space lattice.

11. The non-transitory computer-readable medium of claim 10, wherein predicting the edge weights over the search space lattice comprises connecting the nodes of the search space lattice into paths corresponding to a deep net architecture.

12. The non-transitory computer-readable medium of claim 9, wherein adjusting the weights of the graph network comprises defining edge weights for the edges of the search space lattice.

13. The non-transitory computer-readable medium of claim 1, wherein the instructions, when executed by the processor, further perform the function of outputting information that can be used to decode one or more architectures by selecting paths in the search space lattice using edge weights of the search space lattice.

14. The non-transitory computer-readable medium of claim 13, wherein selecting the paths in the search space lattice comprises removing edges of the search space lattice that have low edge weight relative to other edges in the search space lattice.

15. The non-transitory computer-readable medium of claim 8, wherein the graph network is a directed acyclic graph network.

16. A non-transitory computer-readable medium having executable instructions stored thereon that, when executed by a processor, perform the operations of:
decoding one or more deep net architectures by selecting paths in a search space lattice comprising nodes and edges using edge weights of the search space lattice, wherein edge weights of the selected paths have been optimized using a graph network defined over the search space lattice, wherein the graph network is adapted to predict the edge weights of the search space lattice.

17. The non-transitory computer-readable medium of claim 16, wherein the graph network is a directed acyclic graph network.

* * * * *